United States Patent
Huang (10) Patent No.: US 7,085,680 B2
(45) Date of Patent: Aug. 1, 2006

(54) VEHICLE DIAGNOSTIC TOOL

(75) Inventor: David Huang, Shanghai (CN)

(73) Assignee: Innova Electronics Corporation, Fountain Valley, CA (US)

( * ) Notice: Subject to any disclaimer, the term of this patent is extended or adjusted under 35 U.S.C. 154(b) by 163 days.

(21) Appl. No.: 10/759,655

(22) Filed: Jan. 16, 2004

(65) Prior Publication Data

US 2005/0159923 A1    Jul. 21, 2005

(51) Int. Cl.
*G06F 15/16* (2006.01)

(52) U.S. Cl. ............... 702/183; 702/119; 702/123; 702/182; 717/136; 717/142; 717/143

(58) Field of Classification Search ............... 702/183, 702/182, 119, 123; 701/33; 717/136, 142, 717/143
See application file for complete search history.

(56) References Cited

U.S. PATENT DOCUMENTS

| | | | |
|---|---|---|---|
| 2,960,654 A | 11/1960 | Nelson | |
| 3,646,438 A | 2/1972 | Staff | |
| 4,176,315 A | 11/1979 | Sunnarborg | |
| 4,207,611 A | 6/1980 | Gordon | |
| 4,404,639 A | 9/1983 | McGuire et al. | |
| 4,859,932 A | 8/1989 | Whitley | |
| 4,884,033 A | 11/1989 | McConchie Sr. | |
| 5,003,478 A | 3/1991 | Kobayashi et al. | |
| 5,005,129 A | 4/1991 | Abe et al. | |
| 5,107,428 A | 4/1992 | Bethencourt et al. | |
| 5,157,708 A | 10/1992 | Garthwaite et al. | |
| 5,214,582 A | 5/1993 | Gray | |
| 5,247,245 A | 9/1993 | Nelson | |
| 5,278,508 A | 1/1994 | Bowman | |
| 5,285,163 A | 2/1994 | Liotta | |
| 5,359,290 A | 10/1994 | Cervas | |
| 5,394,093 A | 2/1995 | Cervas | |
| 5,400,018 A | 3/1995 | Scholl et al. | |
| 5,481,906 A | 1/1996 | Nagayoshi et al. | |
| 5,491,418 A | 2/1996 | Alfaro et al. | |
| 5,506,772 A | 4/1996 | Kubozono et al. | |
| 5,541,840 A | 7/1996 | Gurne et al. | |
| 5,631,831 A * | 5/1997 | Bird et al. ............... 701/29 |
| 5,657,233 A | 8/1997 | Cherrington et al. | |
| 5,758,300 A | 5/1998 | Abe | |
| 5,916,286 A | 6/1999 | Seashore et al. | |
| 6,122,575 A * | 9/2000 | Schmidt et al. ............... 701/29 |
| 6,225,898 B1 | 5/2001 | Kamiya et al. | |
| 6,263,265 B1 | 7/2001 | Fera | |
| 6,295,492 B1 | 9/2001 | Lang et al. | |

(Continued)

OTHER PUBLICATIONS

Sunpro Sensor Testers Product Comparison (4 pages), 1995.

(Continued)

*Primary Examiner*—Marc S. Hoff
*Assistant Examiner*—Phuong Huynh
(74) *Attorney, Agent, or Firm*—Stetina Brunda Garred & BRucker (57) ABSTRACT

A vehicular diagnostic tool is provided for receiving vehicular diagnostic codes from a vehicle on-board computer, and translating the diagnostic codes into diagnostic descriptive data. An input port is provided for receiving vehicular diagnostic codes output from a vehicle under test. A code parser parses the received diagnostic codes into diagnostic code segments. A code translator translates diagnostic code segments into corresponding diagnostic descriptor segments. And, a combiner is provided for combining the code descriptor segments to derive composite diagnostic code descriptors, wherein the composite code descriptors being collectively representative of the received diagnostic code.

33 Claims, 7 Drawing Sheets

U.S. PATENT DOCUMENTS

| | | | |
|---|---|---|---|
| 6,330,499 | B1 | 12/2001 | Chou et al. |
| 6,535,802 | B1 | 3/2003 | Kramer |
| 6,615,120 | B1* | 9/2003 | Rother .................. 701/33 |
| 6,687,584 | B1* | 2/2004 | Andreasen et al. ........... 701/29 |
| 6,725,137 | B1* | 4/2004 | Eagleton et al. ............. 701/29 |
| 6,807,469 | B1* | 10/2004 | Funkhouser et al. .......... 701/33 |
| 2002/0007237 | A1* | 1/2002 | Phung et al. .................. 701/33 |
| 2002/0193925 | A1* | 12/2002 | Funkhouser et al. .......... 701/33 |
| 2003/0060953 | A1 | 3/2003 | Chen |
| 2004/0015911 | A1* | 1/2004 | Hinsley et al. ............. 717/147 |
| 2005/0060070 | A1* | 3/2005 | Kapolka et al. ............. 701/29 |

OTHER PUBLICATIONS

Sunpro Sensor Tester Plus (1 page), undated.

OTC's Latest Innovations (6 pages), 1989.

OTC Diagnostic Testers and Tools for the Professional (20 pages), undated.

OTC System 2000 Diagnostic Testers and Tools (24 pages), undated.

EPA Performing Onbard Disgnostic System Checks as Part of a Vehicle Inspection and Maintenance Program (25 pages) Jun. 2001.

Equus Products, Inc. Catalog, pp. 1-6 (1998).

Equus Products, Inc. Catalog, Automotive Testers, Gauge and Tachometers and Cruise Control, pp. 1-4 (1995).

Sunpro Catalog by Actron, pp. 3-8 (Nov. 1996).

Innova Electronics Corporation Brochure, 3100 OBD II Code Rader (2001).

* cited by examiner

VEHICLE DIAGNOSTIC TOOL

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

The present invention relates to vehicular diagnostic tools, and more particularly, to a diagnostic tool having a parsed database of code descriptors to allow storage of multiple vehicle codes in a smaller, non-compressed database.

Vehicular diagnostic tools are operative to receive diagnostic codes from a vehicle on-board computer. An example the codes may be diagnostic trouble codes (DTCs), such as are used in the OBDI and OBDII diagnostic code protocols. Code readers typically operate to simply read and display the vehicle codes, e.g. "P106". In some cases the code readers may also display the engine condition that corresponds to the received code, e.g. "P109 Engine Temperature High". Scan tools are typically include more functionality then code readers in that they may also generate commands for communication to a vehicle on-board computer to regulate the operation of the on-board computer and the nature of the received information. Both code readers and scan tools are considered vehicle diagnostic tools within the scope of the present disclosure.

Where the diagnostic tool is operative to display descriptive data corresponding to the received automotive code, a database of the descriptive data or descriptors corresponding to each received code is commonly stored in memory. Insofar as there may be hundreds or thousands of possible codes for each type of vehicle, the database capacity requirements may be enormous if the tool is intended to be used for multiple types of vehicles.

Many earlier diagnostic tools were specific to certain types of vehicles or manufacturers. This was necessary to avoid prohibitive memory requirements to store code descriptors for many different vehicles. Later scan tools included replaceable cartridges that may be connected to the diagnostic tool. The cartridges may include codes and associated descriptive data specific to the type or model vehicle under test. As such, multiple cartridges might be used with a single diagnostic tool, with each cartridge storing code and descriptors for a specific vehicle(s). While this approach provided increased functionality of the diagnostic tools, it required users to purchase multiple cartridges. Further, such cartridges commonly have limited update capacity and may be subject to mechanical failures in relation to pin connectors and the like. Accordingly, such cartridge based systems, while useful to address deficiencies in the earlier diagnostic tools, remain subject to various limitations in use, reliability, and update capacity.

Other diagnostic tools have taken a different approach to providing multi-vehicle functionality while avoiding producing the inherent limitations of cartridge based devices. Such systems have used data compression techniques to store multi-vehicle codes and descriptors within a smaller memory disposed in the diagnostic tool. As a result, the tool can interface with a variety of different type vehicles without the need to utilize of interchangeable cartridges. While such handheld tools improved upon the functionality of cartridge based diagnostic tools, they remain subject to various limitations. For example, such systems require decompression of descriptive data associated with the vehicle under test. Moreover, the decompression procedure utilizes processing resources and adds to complexity of the tool. Further, while such devices can possibly be upgraded to load additional information into memory, the information must be loaded in accordance with the same compression techniques that are utilized to decompress the descriptive data in relation to the received vehicle codes.

The present invention is directed to a diagnostic tool, suitable for use with multiple types of vehicles, but without the requirement for either interchangeable cartridges or data compression techniques to store diagnostic codes or descriptors. As described more fully below, the present invention utilizes operating and program techniques that significantly reduce the database size requirements or storing code descriptors, without the need for data compression techniques, or the use of replaceable, vehicle specific cartridges. As such, the present invention avoids the need for brute force processing of received diagnostic codes, while maintaining multi-vehicle functionality in a simple, easy to use device.

BRIEF SUMMARY OF THE INVENTION

A vehicular diagnostic tool is provided for receiving vehicular diagnostic codes from a vehicle on-board computer, and translating the diagnostic codes into diagnostic descriptive data. The tool includes an input port for receiving vehicular diagnostic codes output from a vehicle under test; a code parser for parsing the received diagnostic codes into diagnostic code segments; a code translator for translating diagnostic code segments into corresponding diagnostic descriptor segments; and a combiner for combining the code descriptor segments to derive composite diagnostic code descriptors, wherein the composite code descriptors being collectively representative of the received diagnostic code.

According to another aspect of the present invention, the parser is operative to parse received diagnostic codes into generic code segments and specific code segments. According to another aspect of the present invention, the code translator includes a look-up table including generic descriptor segments and specific descriptor segments. Yet another aspect of the present includes the generic descriptor segments corresponding to the generic, diagnostic code segments and the specific descriptor segments corresponding to the specific diagnostic code segments. And still another aspect includes a combiner which combines generic descriptor segments and specific descriptor segments to derive the composite code descriptors.

A first method of processing vehicular diagnostic codes to derive descriptive diagnostic information is also provided according to an aspect of the present invention. The method includes receiving vehicular diagnostic codes; parsing the received diagnostic codes to derive diagnostic code segments; translating the diagnostic code segments into corresponding diagnostic descriptor segments; and combining the diagnostic descriptor segments to derive a composite code descriptor corresponding to the received diagnostic codes.

Additionally, according to other aspects of the present invention, the method of processing vehicular diagnostic codes to derive descriptive diagnostic information may include parsing the received diagnostic code into generic code segments and specific code segments. Moreover, translating may include translating code segments to derive generic descriptor segments and specific descriptor segments. Combining may include combining generic descriptor segments and specific descriptor segments.

A second method for displaying automobile diagnostic codes and affiliated definitions of the diagnostic codes on a handheld automotive diagnostic electronic device is also provided according to another aspect of the present invention. The second method includes compiling a first comprehensive master list of diagnostic codes and respective definitions for each diagnostic code, wherein the first master list includes diagnostic codes and definitions from a multitude of vehicles made from a variety of manufacturers. The second method further includes generating a plurality of look-up tables identified by and sortable by generic code segments parsed from a respective diagnostic code, each of the plurality of look-up tables comprising a dictionary which correlates at least one unique symbol to at least one descriptive word, phrase and term which comprises a portion of an affiliated definition. Also, the second method includes compiling a second comprehensive master list of diagnostic codes correlating to the first master list, each of the diagnostic codes further having an affiliated symbolic codification which is compiled by selecting the at least one unique symbol correlating to the at least one descriptive word, phrase and term as defined by one of the plurality of look-up tables, and listing the at least one selected unique symbol in an order that logically reflects the respective affiliated definition for a respective diagnostic code.

According to other aspects of the present invention, the method may include storing the plurality of look-up tables and the second comprehensive master list in a flash memory of the handheld automotive diagnostic electronic device. Additionally, the method may include receiving at least one diagnostic code from an on-board computer of a vehicle into at least one of a central processor, ROM or SRAM of the automotive diagnostic device. The method may also include referring to the second master list, identifying the diagnostic code listed in the second master list that correlates to the diagnostic code received in the at least one of a central processor, ROM or SRAM. Moreover, the method may include identifying one of the plurality of look-up tables which correlates to a respective generic code segment parsed from the subject diagnostic code and copying the identified look-up table into SRAM.

According to other aspects of the present invention, the method may include referring to the copied look-up table, and further referring to the symbolic codification correlating to the subject diagnostic code, and translating each of the at least one selected unique symbols to the respective descriptive word, phrase and term which is correlated to the at least one selected unique symbol by referring the copied look-up table. According to another aspect of the present invention, the process includes combining the translated respective descriptive words, phrases and terms to derive a composite definition reflective of the diagnostic code received from the on-board computer of the vehicle. The process may also include displaying the derived composite definition on a display of the handheld automotive diagnostic electronic device. Furthermore, according to other aspect of the present invention, the generic code segment identifies a generic set of diagnostic codes germane to a common subject matter. Moreover, the plurality of look-up tables and the second comprehensive master list may be hardcoded into the device.

Another aspect of the present invention is computer readable medium storing a program for receiving vehicular diagnostic codes from a vehicle on-board computer, and translating the diagnostic codes into diagnostic descriptive data in a handheld vehicle diagnostic device. The medium includes a source code segment for receiving vehicular diagnostic codes output from a vehicle under test; a source code segment for parsing the received diagnostic codes into diagnostic code segments; a source code segment for translating diagnostic code segments into corresponding diagnostic descriptor segments; and a source segment for combining the code descriptor segments to derive composite diagnostic code descriptors, wherein the composite code descriptors are collectively representative of the received diagnostic code. Additionally, the source code for translation may be stored in flash memory, and the received diagnostic codes may be stored SRAM. Also, a specific portion of the source code for translating diagnostic code may be copied to the SRAM.

And finally, a second form of computer readable medium is provided for storing a program in a handheld diagnostic tool according to yet another aspect of the present invention. The medium may include a source code segment containing a plurality of libraries, each library containing a list of descriptive terms or phrases, wherein each descriptive term or phrase has an affiliated unique symbol assigned thereto. The medium may include a source code segment storing a data matrix which contains a list of diagnostic codes, wherein each diagnostic code has a corresponding codified representation which comprises at least one of the affiliated unique symbols. The medium may also include a source code segment which checks a memory for stored diagnostic codes downloaded from a vehicle on-board computer. The medium may further include source code segment which separately correlates each of the stored diagnostic codes to a specific library. Also, a source code segment may be included in the medium which decodes the codified representation for each stored diagnostic code by replacing each unique symbol with the affiliated descriptive terms or phrases from the specific library.

Additionally, the source code segment containing the plurality of libraries may be stored in flash memory, the source code segment for storing the data matrix may be stored in flash memory, the memory for stored diagnostic codes downloaded from the vehicle may be SRAM, and the specific library may be copied to the SRAM.

Other exemplary embodiments and advantages of the present invention may be ascertained by reviewing the present disclosure and the accompanying drawings.

BRIEF DESCRIPTION OF THE DRAWINGS

The present invention is further described in the detailed description that follows, by reference to the noted drawings by way of non-limiting examples of preferred embodiments of the present invention, in which like reference numerals represent similar parts throughout several views of the drawings, and in which.

DETAILED DESCRIPTION OF THE INVENTION

The present invention is described below in connection with the illustrated embodiments. However, as will be apparent to those of ordinary skill in the art, various alternate embodiments and processing techniques may be implemented which incorporate the same novel structure, function and operation of the embodiments described herein. Moreover, the present invention may has application to diagnosing other vehicles having on-board computers, such as marine vehicles, aircraft, etc. Accordingly, such alternate embodiments and uses are intended to be encompassed within the broader scope and spirit of the invention as described herein.

The present invention utilizes a technique for parsing received diagnostic codes into code segments. In some cases the code segments may be single character segments. In other cases the code segments may be multiple character segments, e.g. where sequential codes utilize common prefixes such as P106, P107, etc. The parsed code segments correspond to parsed code descriptor segments stored in memory. The code descriptor segments may be accessed and combined to produce a composite code descriptor, which collectively correspond to the received diagnostic code.

By parsing the code descriptor into segments, it becomes unnecessary to store a complete code descriptor for each code. Instead of repeatedly storing portions of common code descriptors over and over again, descriptor segments need only be stored once and then accessed and combined with other stored descriptor segments to formulate composite code descriptors. As a result, the code descriptor storage requirements may be reduced to the point that multi-vehicle codes may be stored in the handheld tool without the need for compression techniques or the use of multiple interchangeable cartridges.

Figure 1:
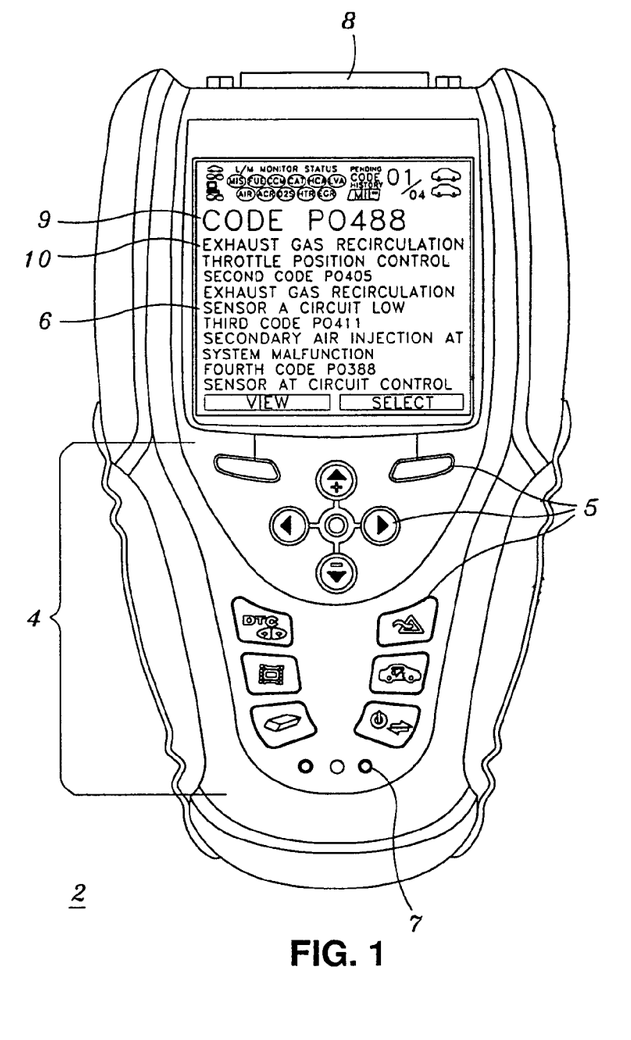
FIG. 1 illustrates an exemplary embodiment of a handheld vehicle diagnostic scan tool according to an aspect of the present invention.
Figure 2:
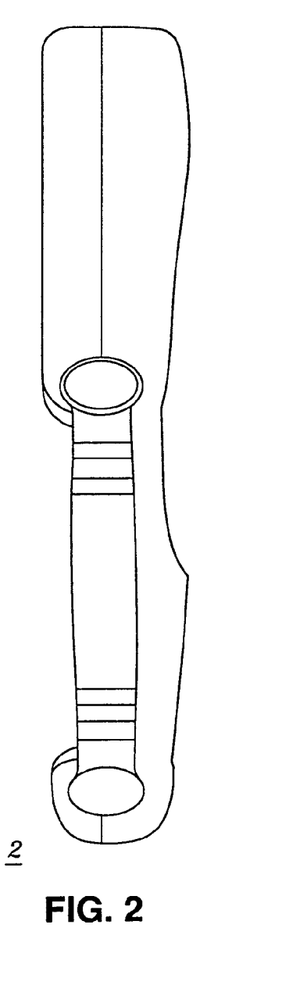
FIG. 2 shows a side view of the handheld vehicle diagnostic scan tool from FIG. 1.

FIGS. 1 and 2 depict an exemplary embodiment of a handheld vehicle diagnostic scan tool 2 according to an aspect of the present invention. FIG. 1 is a front view of the handheld diagnostic tool 2, while FIG. 2 represents a side view of the tool 2. The diagnostic tool 2 includes a keypad 4 which provides a plurality of buttons 5 which are utilized to operate the diagnostic tool 2. The functionality and operative features of the buttons 5 are beyond the scope of the invention. A display 6 is provided such as a liquid crystal display. A variety of data may be displayed including diagnostic codes 9 and descriptive data or descriptors 10 corresponding to the diagnostic codes 9. Furthermore, other data may be shown on the display 6 symbolizing, representing, and/or indicating various events, conditions, modes, settings, etc. Additionally, a connector interface 8 is provided on the diagnostic tool 2 such that the tool 2 may connected to an on-board computer of a vehicle via an electrical cable (not shown).

Figure 3:
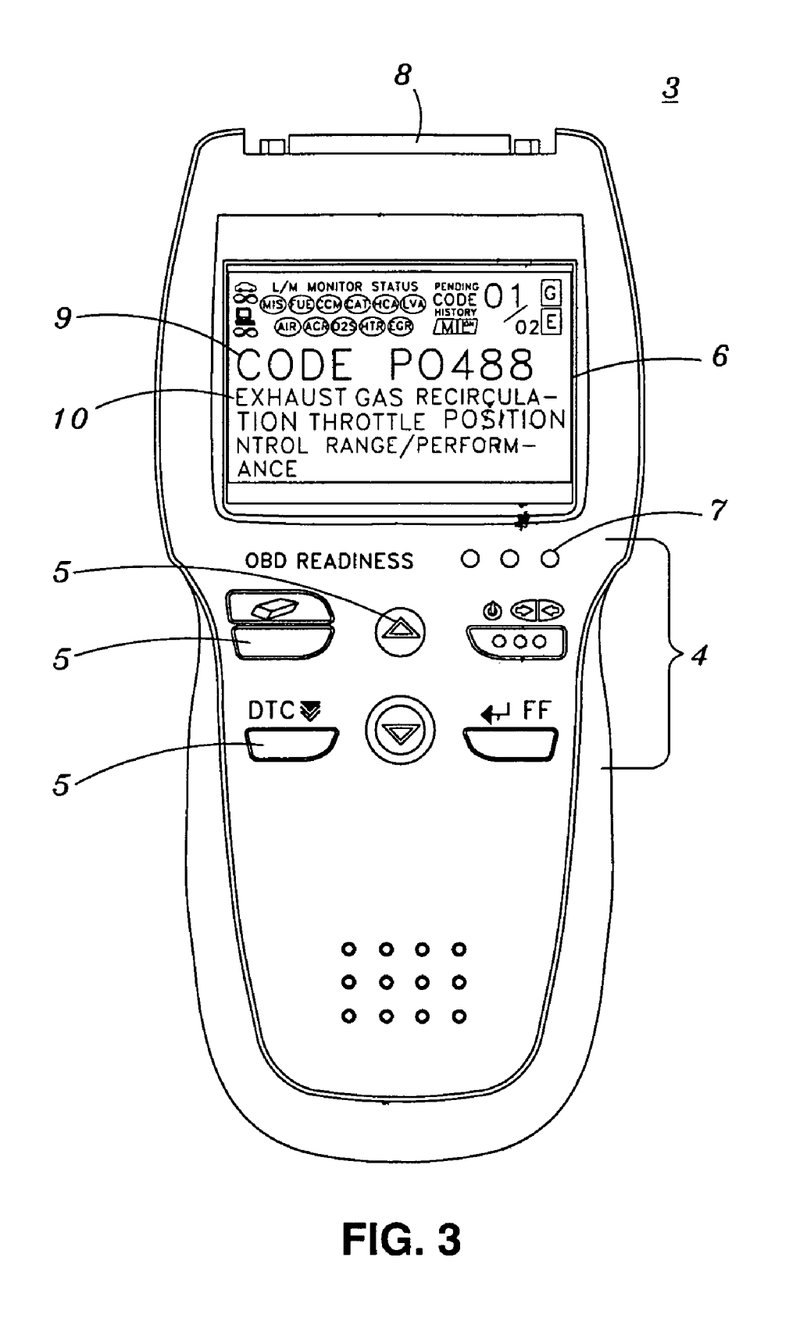
FIG. 3 illustrates an exemplary embodiment of a handheld vehicle code reader tool according to an aspect of the present invention.

FIG. 3 illustrates an exemplary embodiment of a handheld vehicle code reader tool 3 according to an aspect of the present invention. The code reader tool 3 includes a keypad 4 which provides a plurality of buttons 5 which are utilized to operate the code reader tool 3. The functionality and operative features of the buttons 5 are beyond the scope of the invention. A display 6 is provided such as a liquid crystal display. A variety of data may be displayed including diagnostic codes 9 and descriptors 10 corresponding to the diagnostic codes 9. Furthermore, other data may be shown on the display 6 similar to that of diagnostic tool 2. Additionally, a connector interface 8 is provided on the code reader tool 3 such that the tool 3 may connected to an on-board computer of a vehicle via an electrical cable (not shown).

Figure 4:
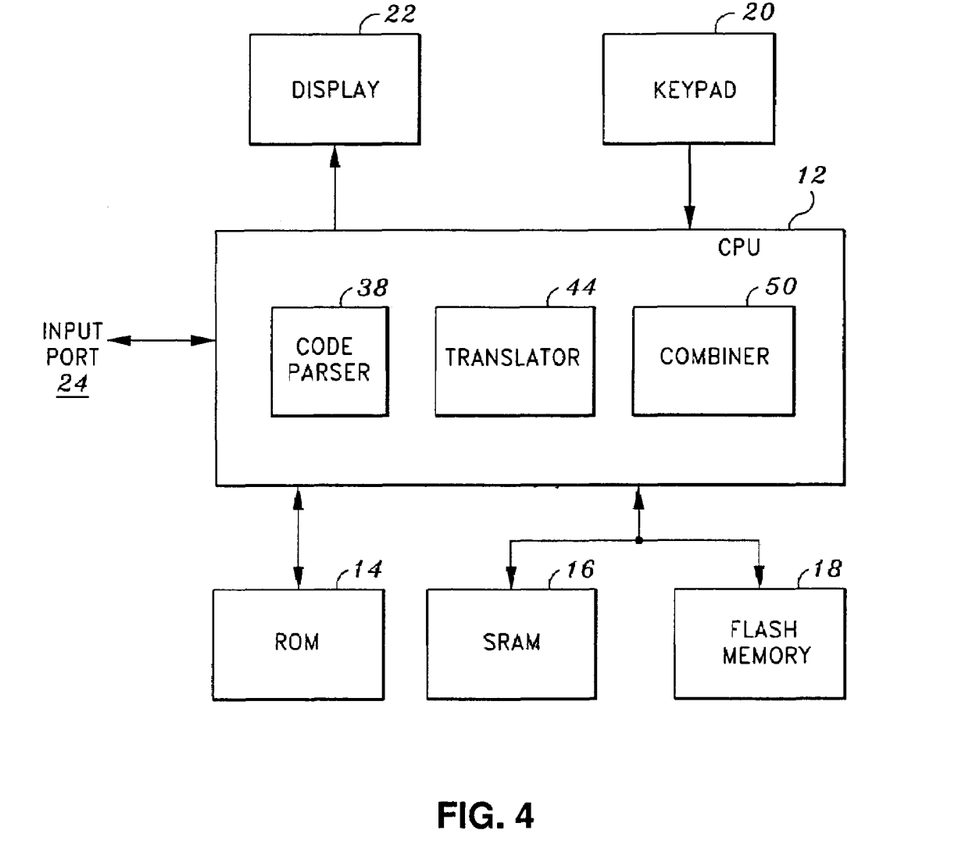
FIG. 4 is a schematic of an exemplary embodiment of the computer architecture of the present invention.

FIG. 4 is an exemplary embodiment of the architecture of either the handheld vehicle diagnostic scan tool 2 and/or the handheld vehicle code reader tool 3 according to an aspect of the present invention. Either tool 2, 3 may be provided with a central processing unit or microcontroller 12 in which processes may be performed. The CPU may include a code parser 38, a translator 44, and a combiner 50. A variety of memory devices are provided including ROM 14, SRAM, 16 and flash memory 18. Preferably, an LCM display module 22 and a keypad 20 are electrically connected to the CPU 12. Additionally an input port 24 is provided to input or output data from the CPU 12. It is noted that the aforementioned architecture is merely an example of an architecture scheme which may be implemented in the device 2, 3, and it is further appreciated that other architecture schemes know in the art that are utilized in similar handheld electronic devices may also be implemented to accomplish the same result.

Figure 5:
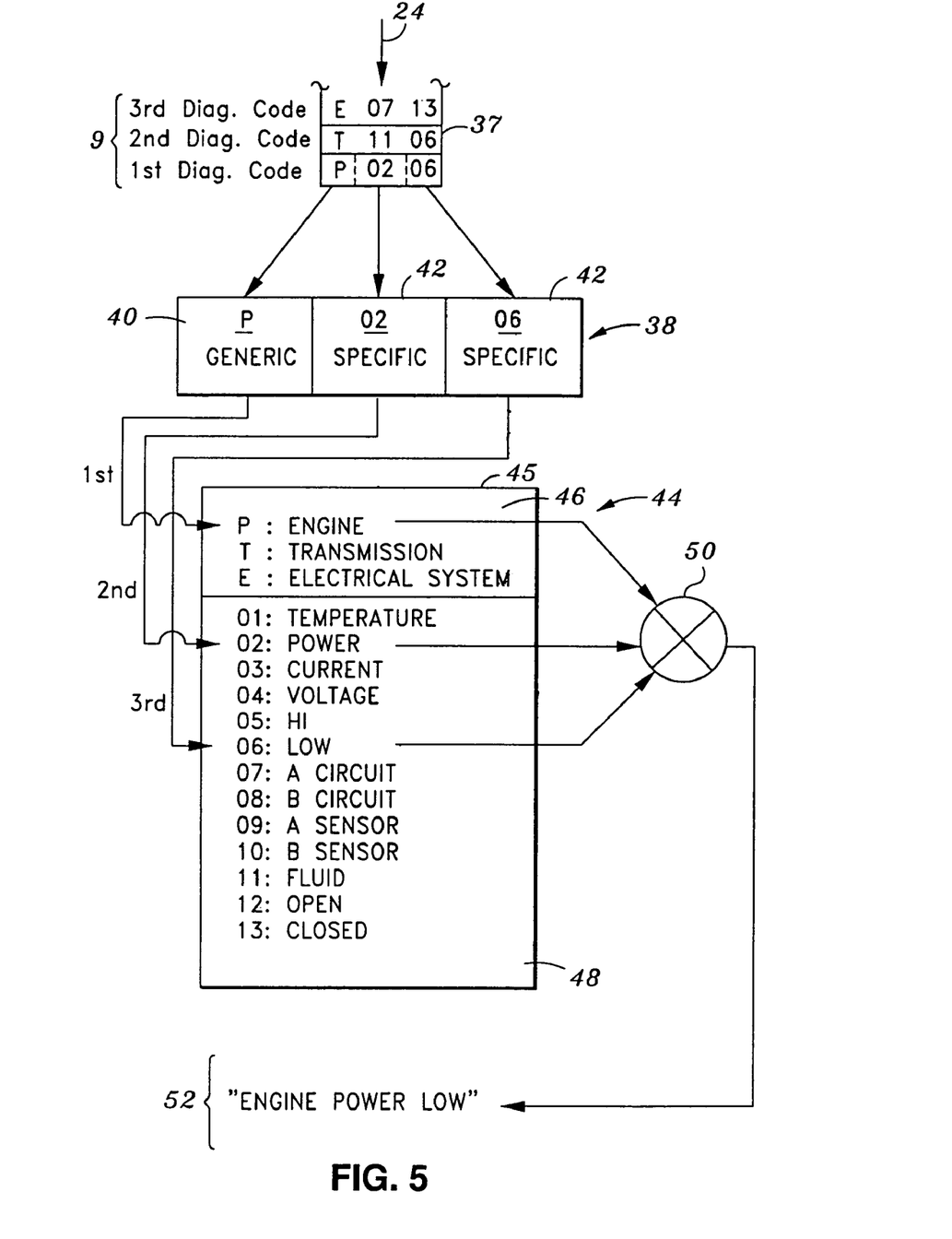
FIG. 5 is a schematic diagram which illustrates a code parser, translator, and combiner and an operation performed therein, according to an aspect of the present invention.

FIG. 5 schematically diagrams a code parser 38, translator 44 and combiner 50 according to an aspect of the present invention. The code parser 38, translator 44 and combiner 50 may be programmed or embedded into at least one of the CPU 12, ROM, 14, SRAM 16 and flash memory 18 in a variety of manners known in the art. In particular, an input port 24 is provided for receiving vehicular diagnostic codes 9 output from an on-board computer from a vehicle under test (not shown). A stack of registers 37 may be provided to accept a plurality of diagnostic codes 9. After a diagnostic code 9, for instance "P0206" is received in the stack of registers 37, the diagnostic code "P0206" is routed to a code parser 38 which parses the received diagnostic code 9 into diagnostic segments. The code parser 38 may further be operative to parse the received diagnostic codes 9 into generic code segments 40 and specific code segments 42. In the exemplary embodiment, the diagnostic code "P0206" is parsed into a generic segment "P" and a pair of specific segments "02" and "06". After the subject diagnostic code 9 has been parsed into generic code segments 40 and specific code segments 42, the segments are routed to a code translator module 44 for translating diagnostic code segments 40, 42 into corresponding diagnostic descriptor segments 44, 46. To implement the translation, a look-up table 45 may be utilized to correlate and/or compare the received diagnostic code segments 40, 42 to diagnostic descriptor segments 44, 46. The look-up table 45 may further be organized into a section for generic descriptor segments 40 and a section for specific descriptor segments 46. In the provided example, the generic segment "P" is translated to a generic descriptor segment "Engine", and the specific descriptor segments "02" and "06" are translated into the specific segments "Power" and "Low", respectively. Once the code segments 40, 42 have been translated into appropriate descriptor segments 44, 46, the data is routed to a combiner 50 and then combined to derive a composite of diagnostic codes descriptors 52 which may then be displayed. In the provided example, a composite diagnostic code descriptor "Engine Power Low" is derived from the originally input diagnostic code "P0206". The process may be repeated for every diagnostic code received into the stack of registers 37.

Figure 6:
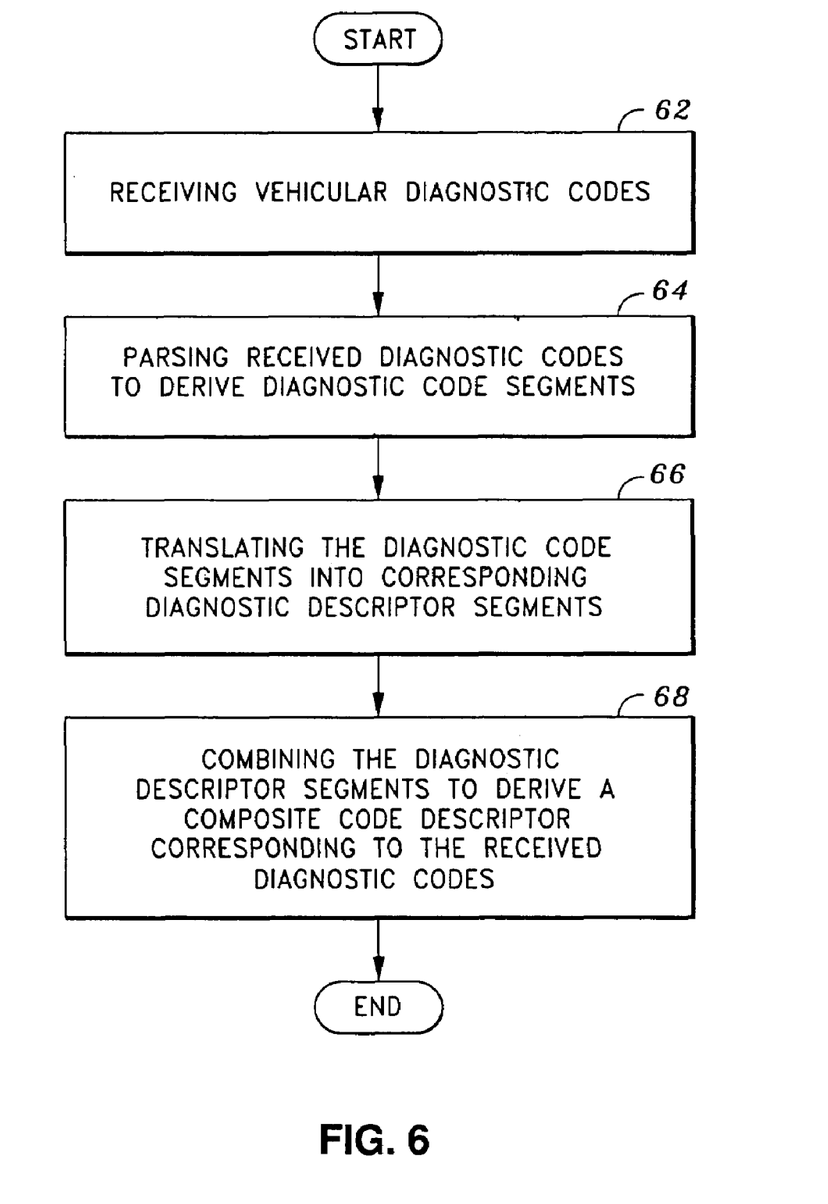
FIG. 6 shows an exemplary processing operation performed in the present invention.

FIG. 6 shows an exemplary processing operation performed in the code parser 38, translator 44 and combiner 50 modules. The exemplary process may be summarized as follows: First, at 62 the vehicular diagnostic codes 9 are received. Next, at 64 the received diagnostic codes are parsed to derive diagnostic code segments 40, 42. Then, at 66 the diagnostic codes segments 40, 42 are translated into corresponding diagnostic descriptor segments 46, 48. And finally, at 68 the diagnostic descriptor segments 46, 48 are combined to derive a composite code descriptor 52 corresponding to the received diagnostic code 9.

Figure 7:
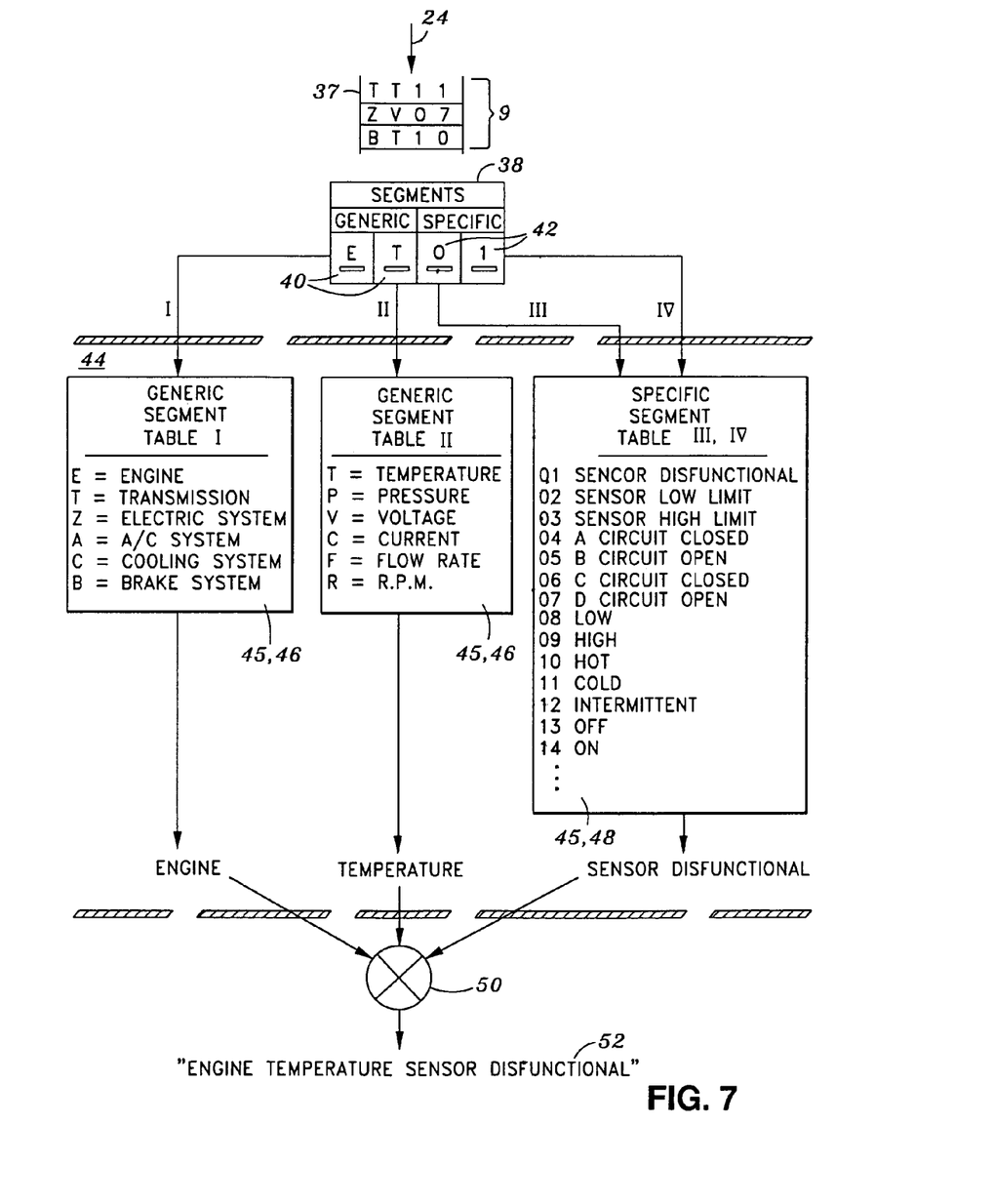
FIG. 7 is a schematic diagram which illustrates an alternative code parser, translator, and combiner and an operation performed therein, according to an aspect of the present invention.

FIG. 7A illustrates a second alternative exemplary code parsing translation technique 62 which may also be implemented in the device 2, 3. In particular, an input port 24 is provided for receiving vehicular diagnostic codes 9 output from an on-board computer from a vehicle under test (not shown). The stack of registers 7 is adapted to accept a plurality of diagnostic codes 9. For instance, after a diagnostic code 9, for instance "ET01" is received in the stack of registers 7, the diagnostic code "ET01" is routed to the code parser 38 which parses the received diagnostic code 9 into diagnostic segments into segments I–IV. The code parser 38 is operative to parse the received diagnostic codes 9 into at least one generic code segment 40 and at least one specific code segment 42. In the exemplary embodiment, the diagnostic code "ET01" is parsed into a pair of generic segments "E" and "T" and a pair of specific segments "0" and "1". After the diagnostic code 9 has been parsed into generic code segments 40 and specific code segments 42, the segments are routed to the code translator module 44 for translating diagnostic code segments 40, 42 into corresponding diagnostic descriptor segments 44, 46. To implement the translation, a plurality of look-up tables 45 may be utilized to correlate and/or compare the received diagnostic code segments 40, 42 to diagnostic descriptor segments 44, 46. The plurality of look-up tables 45 may further be organized into separate tables for generic descriptor segments 40 and for specific descriptor segments 46. In the provided example, the generic segment "E" (from Table I) and "T" (from Table II) are translated to a generic descriptor segment "Engine" and "Temperature", respectively, and the specific descriptor segments "0" and "1" are cumulatively translated into the specific segments "Sensor Disfunctional". Once the code segments 40, 42 have been translated into appropriate descriptor segments 44, 46, the data is routed to the combiner 50 and then combined to derive a composite code descriptor 52 which may then be displayed. In the provided example, a composite code descriptor "Engine Temperature Sensor Disfunctional" is derived from the originally input diagnostic code "ET01". The process may be repeated for every diagnostic code received into the stack of registers 37.

Figure 8:
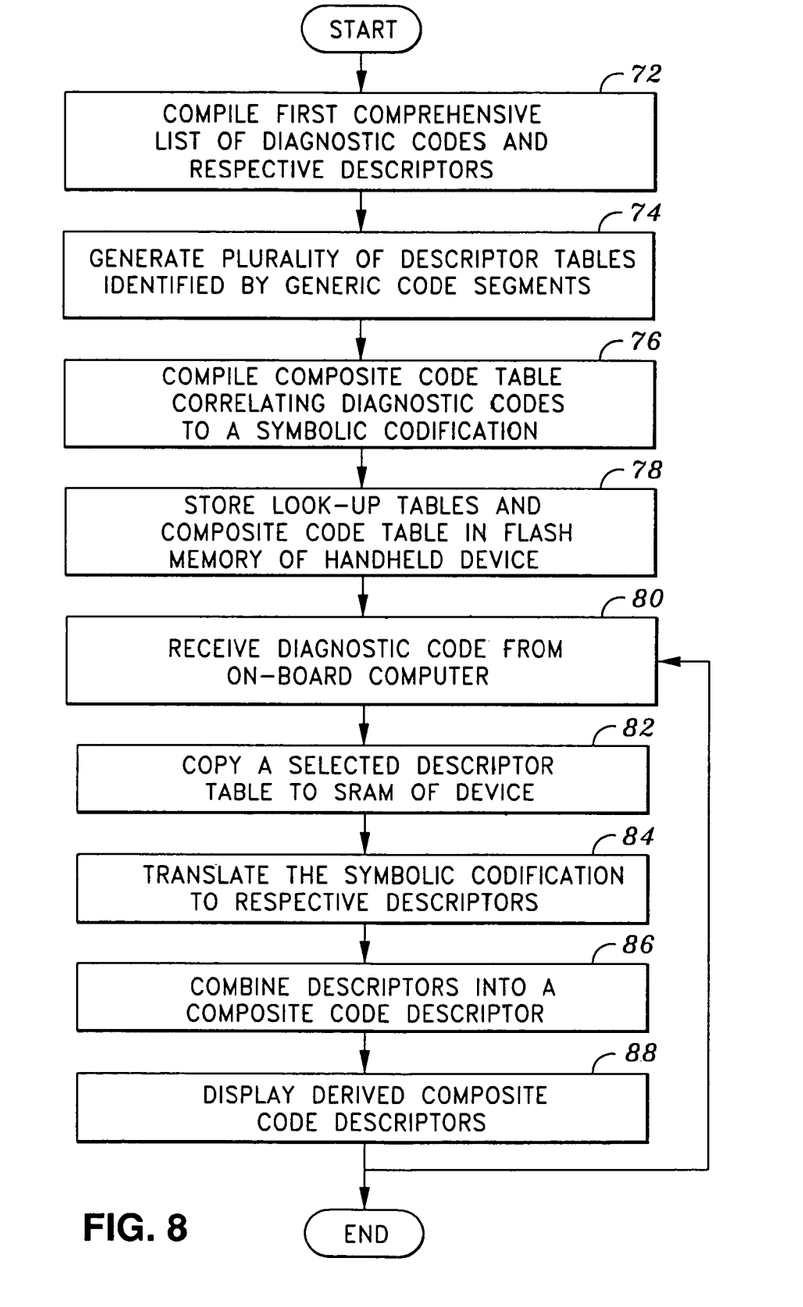
FIG. 8 shows an alternative exemplary processing operation performed in the present invention.

FIG. 8 shows an alternative method for displaying automobile diagnostic codes 9 and affiliated definitions 10 of the diagnostic codes 9 on a handheld automotive diagnostic electronic device. The method may include the steps as herein now described. At 72, a first comprehensive master list of diagnostic codes 9 and respective descriptors or definitions 10 for each diagnostic code 9 is compiled, wherein the first master list includes diagnostic codes 9 and define 10 from a multitude of vehicles made from a variety of manufacturers. An exemplary first comprehensive master list is shown in Table 1 below:

TABLE 1

Comprehensive list of diagnostic codes and correlated descriptors

| DTC | Descriptors/Definitions |
|---|---|
| P0710 | Transmission Fluid Temperature Sensor A Circuit |
| P0711 | Transmission Fluid Temperature Sensor A Circuit Range/Performance |
| P0712 | Transmission Fluid Temperature Sensor A Circuit Low Input |
| P0713 | Transmission Fluid Temperature Sensor A Circuit High Input |
| P0714 | Transmission Fluid Temperature Sensor A Circuit Intermittent |

At 74, a plurality of descriptor tables, which may be collectively referred to as a "library", are generated. Each descriptor table may be identified by and sortable by generic code segments derived from a subject diagnostic code. For instance, the generic code segment may identify a set of diagnostic codes 9 germane to a common subject matter. Each of the plurality of descriptor tables may include descriptors or a "words library" which correlates at least one unique symbol to at least one descriptive word, phrase and term which comprises a segment of an affiliated descriptor 10. Moreover, numerous descriptor tables or "Words libraries" may be separated into numerous segments such as P00xxWord for DTC from P0000 to P0099, and P01xxWord for DTC from P0100 to P0199 . . . etc, to further provide a separation scheme for flash memory banking.

An exemplary descriptor table for an exemplary "P071x Words Library" is shown below in Table 2:

TABLE 2

Descriptor Table

| [0]: | Transmission |
|---|---|
| [1]: | Fluid Temperature Sensor |
| [2]: | A |
| [3]: | Circuit |
| [4]: | Range/Performance |
| [5]: | Low |
| [6]: | High |
| [7]: | Input |
| [8]: | Intermittent |

At 76, a second comprehensive master list of diagnostic codes correlating to the first master list is compiled, each of the diagnostic codes further having an affiliated symbolic codification or composite code which is compiled by selecting one or a series of unique symbols correlating to the at least one descriptive word, phrase and term, as defined by one of the descriptor tables and listing the at least one selected unique symbol in an order that logically reflects the respective affiliated descriptor 10 for a respective diagnostic code 9. The listing of the symbols for a diagnostic code is referred to as a composite code. For instance, a portion of the second comprehensive list (also referred to as "composite code table") representing diagnostic codes P0710 to P0714, is provided to generate the affiliated symbolic codifications (or composite codes) as shown in Table 3:

TABLE 3

Composite Code Table

| | |
|---|---|
| P0710: | [0], [1], [2], [3] |
| P0711: | [0], [1], [2], [3], [4] |
| P0712: | [0], [1], [2], [3], [5], [7] |
| P0713: | [0], [1], [2], [3], [6], [7] |
| P0714: | [0], [1], [2], [3], [8] |

In 78, the plurality descriptor tables and the composite code table are stored in a flash memory 18 of the handheld automotive diagnostic electronic device. The plurality of descriptor tables and the composite code table may be part of a program written in any computer language, preferably C language. Furthermore, the descriptor tables and the composite code table may be hardcoded in the flash memory of the handheld automotive diagnostic electronic device 2, 3. As a result of the device's 2, 3 processing and operational architecture, a life (running) process and compressed techniques are not utilized. By using such software programming scheme in combination with the processing architecture of the device 2, 3, all diagnostic code descriptors may be stored in the composite code format in a minimal sized flash memory 18.

In step 80, at least one subject diagnostic code 9 from an on-board computer of a vehicle is received into at least one of a central processor 12, ROM 14 or SRAM 16 of the automotive diagnostic device 2, 3. In a preferred embodiment, the diagnostic codes are downloaded and stored into SRAM. Step 82 encompasses referring to the composite code table, identifying the diagnostic code 9 listed in the composite code table that correlates to the subject diagnostic codes 9 received in the at least one of a central processor 12, ROM 14 or SRAM 16. Additionally, the descriptor tables which correlates to a respective generic code segment derived from the subject diagnostic code 9 and may be copied into SRAM. 3. For example, in the on-going example, the diagnostic code 9 is checked, and if it is P code and first three digits are "071", then according to last digit, one line of P071x Words Library is moved to SRAM 16. Step 84 includes referring to the copied descriptor table, and further referring to the symbolic codification or composite code correlating to the subject diagnostic code 9, and translating each of the at least one selected unique symbols to the respective descriptive word, phrase and term which is correlated to the at least one selected unique symbol by referring to the copied descriptor table table. At 86, the translated respective descriptive words, phrases and terms are combined to derive a composite code descriptor reflective of the subject diagnostic code 9 received from the on-board computer of the vehicle. And at 88, the derived composite code descriptors are displayed on a display 22 of the handheld automotive diagnostic electronic device. For instance, in the on-going example, one line of the P071x Data Library is loaded into the CPU 12.

In another embodiment of the present invention, the diagnostic tool receives the diagnostic code. The first digit of the diagnostic code (such as "PO301"), the is parsed. Thus, for example the diagnostic code can be parsed into for example Pxxx, Cxxx, Bxxx or Uxxx. Next, the second digit is parsed to for example P0xx, P1xx, P3xx. In this example, the P0xx and P2xx are generic DTCs and P1xx and P3xx are manufacture specific. For each code in the P0xx (P0000–P0999), P1xx (P1000–P1999), P2xx (P2000–P2999) and P4xx (P4000–P4999) ranges, is a correlation to a composite listing of indicia/addresses. Then, to find the descriptor, the respective indicia/addresses are accessed.

In accordance with various embodiments of the present invention, the methods described herein may be implemented as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual processing can also be constructed to implement the methods described herein.

It should also be noted that the software implementations of the present invention as described herein are optionally stored on a tangible storage medium, such as: a magnetic medium such as disk or tape; a magneto-optical or optical medium such as a disk; or a solid state medium such as a memory card or other package that houses one or more read-only (non-volatile) memories, random access memories, or other re-writable (volatile) memories. Accordingly, the invention is considered to include a tangible storage medium or distribution medium, as listed herein and includes art recognized equivalents and successor media, in which the software implementations herein are stored.

Although the present invention includes components and functions in the embodiments with reference to particular standards (e.g., OBI, OBII), the invention is not limited to such standards and protocols. Such standards are periodically superseded by faster or more efficient equivalents having essentially the same functions. Accordingly, replacement standards and protocols having the same functions are considered equivalents.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

What is claimed is:

1. A vehicular diagnostic tool for receiving vehicular diagnostic codes from a vehicle on board computer, and translating the diagnostic codes into diagnostic descriptive data comprising:
    an input port for receiving vehicular diagnostic codes output from a vehicle under test;
    a code parser for parsing the received diagnostic codes into diagnostic code segments;
    a code translator for correlating diagnostic code segments to corresponding diagnostic descriptor segments; and
    a combiner for combining the code descriptor segments to derive composite diagnostic code descriptors, the composite code descriptors being collectively representative of the received diagnostic code.

2. The diagnostic tool as recited in claim 1 wherein the parser is operative to parse received diagnostic codes into generic code segments and specific code segments.

3. The diagnostic tool as recited in claim 2 wherein the code translator includes a look-up table including generic descriptor segments and specific descriptor segments.

4. The diagnostic tool as recited in claim 2 wherein the generic descriptor segments correspond to the generic diagnostic code segments and the specific descriptor segments correspond to the specific diagnostic code segments.

5. The diagnostic tool as recited in claim 3 wherein the combiner combines generic descriptor segments and specific descriptor segments to derive the composite code descriptors.

6. A method of processing vehicular diagnostic codes to derive descriptive diagnostic information comprising:
receiving vehicular diagnostic codes;
parsing the received diagnostic codes to derive diagnostic code segments;
translating the diagnostic code segments into corresponding diagnostic descriptor segments; and
combining the diagnostic descriptor segments to derive a composite code descriptor corresponding to the received diagnostic codes.

7. The method as recited in claim 6 further comprising the step of storing diagnostic code descriptors segments for a plurality of vehicle types.

8. The method as recited in claim 7 further comprising the step of accessing descriptor code segments in response to identification of a type of vehicle under test.

9. The method as recited in claim 8 wherein identification of the type of vehicle under test proceeds independent of user input.

10. A method of processing vehicular diagnostic codes to derive descriptive diagnostic information comprising:
receiving vehicular diagnostic codes;
parsing the received diagnostic codes to derive diagnostic code segments;
translating the diagnostic code segments into corresponding diagnostic descriptor segments;
combining the diagnostic descriptor segments to derive a composite code descriptor corresponding to the received diagnostic codes;
accessing descriptor code segments in response to identification of a type of vehicle under test;
wherein identification of the type of vehicle under test proceeds by sequential generation of a plurality of linking commands, each linking command being formatted in accordance with an associated vehicle protocol.

11. The method as recited in claim 10 wherein a protocol associated with the vehicle under test is identified and only code descriptor segments corresponding to the identified protocol are accessed by the code translator.

12. The method as recited in claim 6 wherein the step of parsing comprises parsing the received diagnostic code into generic code segments and specific code segments.

13. The method as recited in claim 12 wherein the step of translating comprises translating code segments to derive generic descriptor segments and specific descriptor segments.

14. The method as recited in claim 13 wherein the step of combining descriptor segments comprises combining generic descriptor segments and specific descriptor segments.

15. A handheld electronic automobile diagnostic device for receiving and displaying automobile diagnostic codes and affiliated descriptors, the device comprising:
a handheld unit containing a central processor unit, ROM, SRAM, flash memory, an input port, keypad, and display; and
a computer readable medium for displaying automobile diagnostic codes and affiliated descriptors of the diagnostic codes on said display, the computer readable medium comprising:
a source code segment comprising a list of descriptors segments with associated unique symbol(s);
a source code segment comprising a list of diagnostic codes with an affiliated composite code defined by the unique symbol(s);
a source code segment for receiving at least one diagnostic code from an on-board computer of a vehicle into the device;
a source code segment for identifying the composite code that correlates to the received diagnostic code;
a source code segment for identifying descriptor table(s) that correlate to the received diagnostic code;
a source code segment for translating the unique symbols from the composite code to correlated descriptors;
a source code segment for combining the correlated descriptors to derive a descriptor reflective of the received diagnostic code; and
a source code segment displaying the derived descriptor on the display.

16. The device according to claim 15, wherein the descriptor segment table(s) are identified and searchable by the diagnostic code.

17. The device according to claim 15, wherein the received at least one diagnostic code is stored in the SRAM.

18. The device according to claim 15, wherein the descriptor table(s) and the composite code table(s) are stored within said flash memory.

19. The device according to claim 15, further comprising a source code segment for copying the identified descriptor table(s) into SRAM of the device.

20. A method for displaying automobile diagnostic codes and affiliated descriptors of the diagnostic codes on a handheld electronic automotive diagnostic device, the method comprising:
generating a descriptor segment table(s) comprising a list of descriptor segments with an associated unique symbol(s);
generating a composite code table(s) which includes a comprehensive list of diagnostic codes with an affiliated composite code defined by the unique symbol(s);
storing the descriptors table(s) and the composite code table(s) in a flash memory of the device;
receiving at least one diagnostic code from an on-board computer of a vehicle into the device;
identifying the composite code descriptor table(s) that correlates to the received diagnostic code;
translating the unique symbols from the composite code to correlated descriptors;
combining descriptors to derive a descriptor reflective of the received diagnostic code;
displaying the derived descriptor on a display of the device.

21. The method according to claim 20, wherein the descriptor segment table(s) are identified and searchable by the diagnostic code.

22. The method according to claim 20, wherein the received at least one diagnostic code is stored in SRAM of the device.

23. The method according to claim 20, wherein the memory that the descriptor table(s) and the composite code table(s) is stored within flash memory of the device.

24. The method according to claim 20, further comprising copying the identified descriptor table(s) to SRAM of the device.

25. A computer readable medium storing a program for receiving vehicular diagnostic codes from a vehicle on-board computer, and translating the diagnostic codes into diagnostic descriptive data in a handheld vehicle diagnostic device, the medium comprising:
- a source code segment for receiving vehicular diagnostic codes output from a vehicle under test;
- a source code segment for parsing the received diagnostic codes into diagnostic code segments;
- a source code segment for translating diagnostic code segments into corresponding diagnostic descriptor segments; and
- a source segment for combining the code descriptor segments to derive composite diagnostic code descriptors, the composite code descriptors being collectively representative of the received diagnostic code.

26. The medium according to claim 25, wherein the source code for translation is stored in flash memory.

27. The medium according to claim 25, wherein the received diagnostic codes are stored SRAM.

28. The medium according to claim 25, wherein a specific portion of the source code for translating diagnostic code is copied to the SRAM.

29. A computer readable medium storing a program in a handheld diagnostic tool, the medium comprising:
- a source code segment containing a plurality of libraries, each library containing a list of descriptive terms or phrases, wherein each descriptive term or phrase has an affiliated unique symbol assigned thereto;
- a source code segment storing a data matrix which contains a list of diagnostic codes, wherein each diagnostic code has a corresponding codified representation which comprises at least one of the affiliated unique symbols;
- a source code segment which checks a memory for stored diagnostic codes downloaded from a vehicle on-board computer;
- a source code segment which separately correlates each of the stored diagnostic codes to a specific library;
- a source code segment which decodes the codified representation for each stored diagnostic code by replacing each unique symbol with the affiliated descriptive terms or phrases from the specific library.

30. The medium according to claim 29, wherein the source code segment containing the plurality of libraries is stored in flash memory.

31. The medium according to claim 29, wherein the source code segment for storing the data matrix is stored in flash memory.

32. The medium according to claim 29, wherein the memory for stored diagnostic codes downloaded from the vehicle is SRAM.

33. The medium according to claim 28, wherein the specific library is copied to the SRAM.

* * * * *